United States Patent [19]

Kamiya et al.

[11] Patent Number: 5,755,478
[45] Date of Patent: *May 26, 1998

[54] MOBILE SELF-CONTAINED TRAUMA CARE SYSTEM

[75] Inventors: Eiichi Kamiya, Rolling Hills Estates; Aldo Spadoni, Rancho Palos Verdes, both of Calif.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 469,322

[22] Filed: Jun. 6, 1995

[51] Int. Cl.$^6$ ............................................. A61G 3/00
[52] U.S. Cl. ........................... 296/24.1; 296/19; 296/26; 5/611; 5/81.1 HS
[58] Field of Search ........................... 296/19, 20, 24.1, 296/26, 27, 171, 173, 175; 5/611, 86.1, 81.1 HS

[56] References Cited

U.S. PATENT DOCUMENTS

| | | | |
|---|---|---|---|
| 1,200,852 | 10/1916 | Kern | 296/19 |
| 1,258,694 | 3/1918 | Miller | 296/19 |
| 1,287,855 | 12/1918 | Brand | 296/19 |
| 2,704,989 | 3/1955 | Konecny | 296/19 |
| 2,837,778 | 6/1958 | Kern | 296/173 |
| 3,050,331 | 8/1962 | Mansen | 296/173 X |
| 3,148,911 | 9/1964 | Boyer et al. | 296/19 |
| 3,376,059 | 4/1968 | Corl | 248/352 |
| 3,492,042 | 1/1970 | Nachtigall, Jr. | 296/24.1 |
| 3,499,529 | 3/1970 | Katzfey | 5/611 X |
| 3,531,151 | 9/1970 | Branfield | 296/173 |
| 3,584,864 | 6/1971 | Jung | 5/611 X |
| 3,840,265 | 10/1974 | Stirling et al. | 296/19 |
| 4,101,120 | 7/1978 | Seshima | 5/611 X |
| 4,259,756 | 4/1981 | Pace | 5/81.1 HS |
| 4,352,991 | 10/1982 | Kaufman | 307/9 |
| 4,425,978 | 1/1984 | Star | 296/19 X |
| 4,584,989 | 4/1986 | Stith | 296/20 X |
| 4,644,594 | 2/1987 | Johnson | 5/81.1 HS |
| 4,657,235 | 4/1987 | Schar | 5/611 |
| 5,084,922 | 2/1992 | Louit | 5/611 X |
| 5,092,722 | 3/1992 | Reazer, III et al. | 296/20 X |
| 5,236,390 | 8/1993 | Young | 296/19 |
| 5,335,651 | 8/1994 | Foster | 296/20 X |
| 5,626,151 | 5/1997 | Linden | 128/897 |

FOREIGN PATENT DOCUMENTS

| | | | |
|---|---|---|---|
| 1373384 | 4/1964 | France | 296/19 |
| 0000117 | 1/1915 | United Kingdom | 296/19 |

*Primary Examiner*—Dennis H. Pedder
*Attorney, Agent, or Firm*—Terry J. Anderson; Karl J. Hoch, Jr.

[57] ABSTRACT

The invention provides a mobile, self-contained trauma care system, comprising a vehicle body with a floor, side walls, and wheel means, plural, prone patient supporting means affixed to the side walls of the vehicle body, a central treatment module for receiving plural treatment modules removably positioned on the floor, and a treatment table affixed to the floor and generally centered above the treatment module.

17 Claims, 2 Drawing Sheets

MOBILE SELF-CONTAINED TRAUMA CARE SYSTEM

BACKGROUND OF THE INVENTION

1. Technical Field

The present invention relates to a mobile, self-contained, patient care system capable of providing trauma care, conducting triage, and preparing patients for transportation to full treatment facilities.

2. Background Art

It is recognized that the faster injured persons can receive medical treatment, the more likely it is that their lives can be saved and the impact of their injuries made less severe. The speed of transportation from the place of injury, such as a battlefield or disaster site, to hospitals has increased with improved results.

Many emergency scenarios occur in remote or hazardous areas that limit patient treatment because of the unavailability of medical equipment and supplies. For example, the inaccessibility of wounded in combat zones (beachheads, jungles, etc.), fleeing refugees in remote regions (deserts, mountains, etc.), or injured in natural disaster areas (earthquake, hurricane, fire, volcano, etc.). If a mobile, self-contained treatment facility could be transported to the site of such emergencies, lives could be saved and the effect of injuries could be mitigated.

One approach to emergency patient transport has been the use of an ambulance trailer, such as that shown in U.S. Pat. No. 1,200,852 issued to Walter C. Kern on Oct. 10, 1916. The ambulance disclosed comprised a wheeled trailer for towing by automobiles and fitted with means to support patient stretchers. This invention was solely for transportation of patients and there is no provision for treatment of patients or for carrying medical equipment or supplies.

Another approach to emergency patient transport is disclosed in U.S. Pat. No. 1,258,694 issued to Emma Miller on Mar. 12, 1918. The vehicle disclosed provides for suspended tiers of patient stretchers that are hinged at the walls to collapse when not in use. A passageway is provided between the hinged stretchers to provide access to the patients. Although the vehicle is referred to as a Field Hospital, there is no provision for treatment of patients except for the passageway that allows access to patients by medical treatment personnel.

A transportable medical treatment unit is disclosed in U.S. Pat. No. 5,236,390 issued to Craig A. Young on Aug. 17, 1993. The unit disclosed does include a device for treatment in the form of a gurney on which a patient may be placed. Provision is also made for storage of medical equipment and supplies adjacent the gurney. The unit is not collapsible, which makes it less compact for transportation to a remote emergency site, such as by airlift.

SUMMARY OF THE INVENTION

The present invention is a mobile, self-contained trauma care system. The system includes bunks for placement of patients, an expandable treatment table or gurney for administering medical care to injured, and movable modules for containing equipment, supplies and consumables. The system is collapsible into a compact form that facilitates its transportation by aircraft, such as airplanes or helicopters. In addition, the system has wheels to allow it to be readily moved after deployment in the area of an emergency.

The system has military and civilian uses. A primary military application would be the use in battlefield operations, including hostile locations such as jungles and deserts. The system could also be delivered to a beachhead in support of amphibious operations or onto smaller ships not having extensive medical facilities. The system could also operate as a modular element of a field hospital.

The system also has important humanitarian applications, such as use by international aid agencies assisting victims of natural disasters or political conflict. In addition, such agencies could use the system as a core element around which clinics could be built in remote regions of the world. The system could also be used by organizations such as the National Guard or Red Cross in domestic disasters and major accidents.

The invention is embodied in a mobile, self-contained trauma care system, including a vehicle body with a floor, side walls, wheels, prone patient supporting means affixed to the side walls, a central treatment assembly affixed to the floor of the vehicle body, and a treatment table affixed to the floor of said vehicle body, which table is centered above the treatment module.

DETAILED DESCRIPTION OF THE PREFERRED EMBODIMENT

Figure 1:
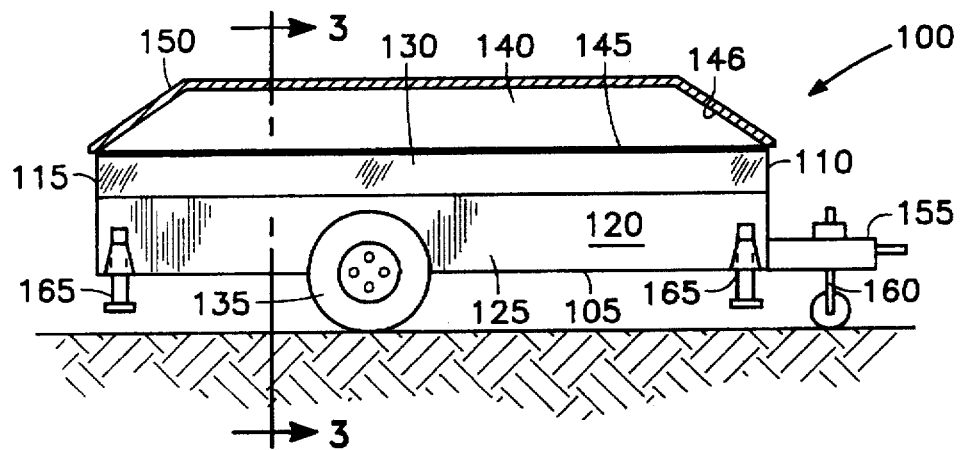
FIG. 1 is a side view of a system of the present invention in a stowed configuration.

A self-contained, mobile trauma care system 100 of the present invention is shown in FIG. 1. The system 100 includes a generally rectangular base 105 enclosed by a vertically extending front wall 110 and rear wall 115. Side walls 120 include a vertical portion 125 and a flange portion 130 extending outwardly from the flange portion just above the top of the tires 135. Side panels 140 include flange members 145 that are affixed to the flange portions 130 by panel hinges 145 or other suitable flexible attachment mechanism. Side panels 140 also include sloped members 146 that engage the front wall 110 and rear wall 115 in the stowed position.

In the stowed position, the side panels 140 collapse and are covered and secured in the stowed position by a convex roof 150, which is shaped to closely engage the side panels 140 to achieve a compact size for the system 100 in a stowed position. A hitch 155, or other suitable connecting device, is attached to the front wall 110 to enable the system 100 to be towed by a powered vehicle such as a truck or jeep.

A transverse leveling device 160 may also be attached to the hitch 155 to achieve leveling of the system 100 about the axis of the wheels 135. Additional longitudinal leveling devices 165 may be attached to the vertical portions 125 to achieve leveling about the longitudinal axis of the system 100.

Figure 2:
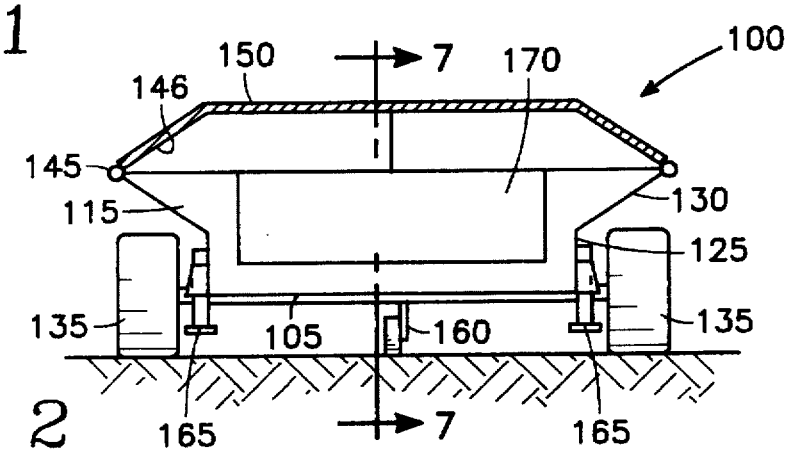
FIG. 2 is an end view of the system shown in FIG. 1.

FIG. 2 shows the rear wall 115, which includes a gate or access door 170 to allow entry of persons or gurneys to transport patients.

Figures 3, 7:
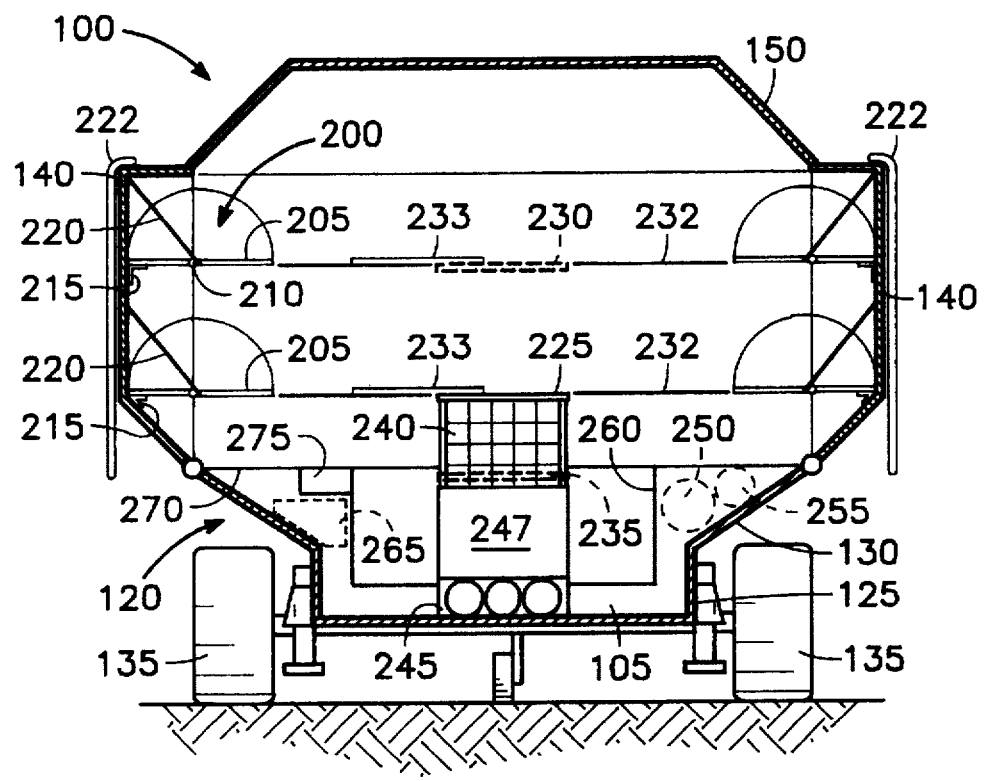
FIG. 3 is a cross section view of the system of FIG. 1 along section 3—3 in an expanded configuration.
FIG. 7 is an cross section view of the system shown in FIG. 1 along section 7—7 in an expanded configuration.

As shown in FIG. 3, bunks 200 are formed from longitudinal bunk sections 205 joined by bunk hinges 210, which allow the bunks to fold into a compact shape when the system is in the stowed position. The bunk sections 205 that are adjacent to side panels 140 may be rigidly affixed to the side panels by brackets 215 and supported by bunk cables 220. Alternately, the bunk sections 205 may be affixed to side panels 140 by additional hinges to allow more space in the interior of system 100 in the stowed position. Flak blankets 222 may be draped on the exterior sides of side panels 140 to protect the system from small arms fire in a combat environment. These blankets 222 may be formed of any suitable material, such as Kevlar.

Treatment table 225 is attached to the base 105 in a generally central position to allow personnel access from both sides of the table. Treatment table 225 is shown at a level convenient for medical personnel to treat patients and to move the patients from the table 225 to the lower ones of bunks 200, but the table 225 may be raised to an elevated position shown as 230 (in shadow) to enable the transfer of patients from the table 225 to the upper ones of bunks 200. Rails 232 extend from at least the forward and rear ends of table 225 to bunks 200 to facilitate the transfer of patients. For example, gurneys 233 may be slid on rails 232 from the table 225 to bunks 200. Table 225 may also be lowered to a storage position 235 (in shadow) when the system 100 is configured in the stowed position.

An equipment and supplies module ("ESM") 240 is located under the treatment table 225 for storage of medicine and treatment equipment. A consumables module ("CM") 245 is located under ESM for storage of consumable items such as water and oxygen. The ESM 240 may also include an internal refrigeration unit to refrigerate supplies during transport and in the field. The combined ESM and CM are mounted in a central treatment module ("CTM") 247, which may be moved in or out of the system 100 as a module.

An auxiliary power unit ("APU") 250 and associated fuel container 255 are mounted between one of the side walls 120 and the interior walls 260 of the system 100. Batteries 265 are mounted in a similar manner, but may be placed on the opposite side of the system 100 to achieve improved weight balance.

Work counters 270 are provided on both sides of the system 100 for medical personnel to use during treatment. A sink 275 is provided in at least one work counter 270 for cleaning patients, medical care personnel, and equipment.

Figures 4, 5, 6:
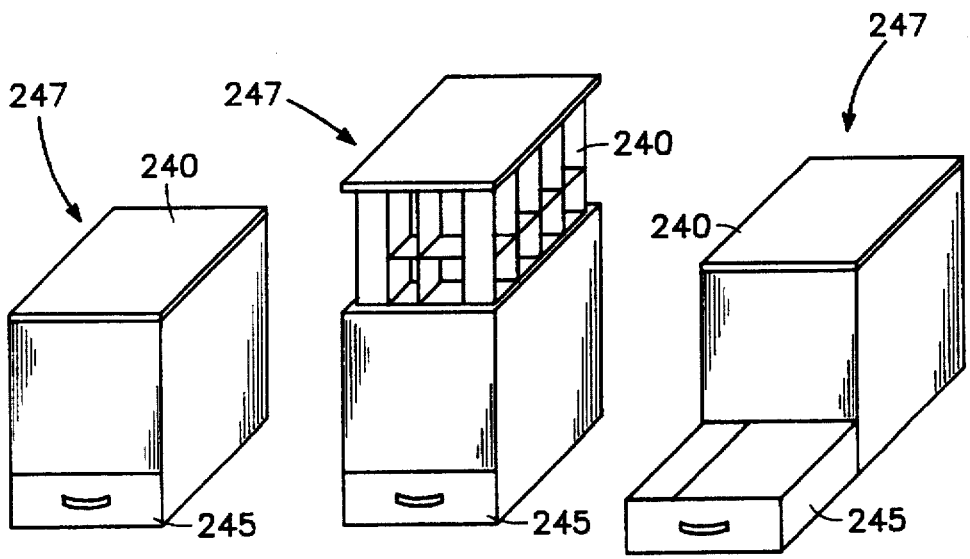
FIG. 4 is a perspective view of the central treatment module of the system of FIG. 1 in a stowed position.
FIG. 5 is a perspective view of the central treatment module of the system of FIG. 1 with the equipment and supplies module in a raised position for treatment or replenishment.
FIG. 6 is a perspective view of the central treatment module of the system of FIG. 1 with the consumables module in an open position for replenishment.

The ESM 240 and CM 245 are shown in their stored or stowed position in FIG. 4. In this position, the ESM and CM would fit under the treatment table 225 in the stored position 235, as shown in FIG. 3. When the table 225 is raised to the treatment position, the ESM 240 is also raised to a treatment position as shown in FIG. 5. This enables access to medicine and supplies stored in the ESM 240 during the performance of treatment procedures. FIG. 6 shows the CM 245 in an open position for the replenishment of consumables, such as water and oxygen bottles.

FIG. 7 shows the placement the ESM 240 and CM 245 under the treatment table 225 in the treatment position. The ESM 240 is illustrated in an open position for treatment or replenishment.

In operation, the system 100 is transported in a stowed position in a vehicle, such as a truck or railcar. It may be airlifted on a transport aircraft or helicopter, and also be carried in a sling below a helicopter. During transportation in the stowed position, the batteries 265 may be used to supply power to refrigerate the ESM 240 and to control the environment inside the system 100, including circulating or conditioning the air. The transport vehicle may also provide external power to the system 100 during transport for these purposes.

After the transport vehicle is in the general area of the combat or disaster, the system 100 may be rolled off the ramp of a transport aircraft, paradropped by parachute, or extracted at low altitude on a pallet. After deployment on the ground, it may be towed by motor vehicle to the site of the combat or disaster.

Once the system 100 is transported to the site where medical treatment is to be provided, the system is leveled using the transverse leveling device 160 and the longitudinal devices 165. Side panels 140 are then raised to a vertical position and the convex roof 150 is fastened to by conventional methods to the panels. An extended front wall portion 300 and an extended back wall portion 305 are then secured to the tops of the front wall 110 and rear wall 115, respectively, the side panels 140 and the roof 150. Enclosure by these elements provides protection against weather and minimizes contamination. If the system is located in a combat environment, flak blankets 222 may be draped from the side panels 140.

After deployment of the side panels 140 and roof 150, the interior components of system 100 may be assembled. The treatment table 225 is raised from the stowed position 235 (as shown in FIG. 3) to a treatment position 225 (also shown in FIG. 3) and the ESM 240 is also raised to a treatment position. Table 225 may also be raised to an elevated position 230 (as shown in FIG. 3) for transfer of patients from the table to one of the upper bunks 200.

Operation of the APU 250 is initiated to provide power for environmental control, refrigeration, lighting, communications, battery charging and medical equipment. The batteries 265 also provide backup power for these purposes in the event of a failure of the APU 250.

When not in use, the ESM 240 and CM 245 may be separately stored to maintain necessary environmental conditions. For example, the entire ESM 240 may refrigerated to maintain the medicine at appropriate temperatures. After a notice to deploy the system 100 is received, the ESM 240 is removed from refrigeration and installed in the CTM 247. The CM 245 is inspected to ensure integrity of its contents, and then installed in the CTM 247. The assembled CTM 247 is then installed in the system 100.

Although the present invention has been described with reference to preferred embodiments, workers skilled in the art will recognize that changes may be made in form and detail without departing from the spirit and scope of the invention.

What is claimed:

1. A mobile, self-contained trauma care system comprising:

a vehicle body defining a lateral wheel base;

a pair of foldable opposed side walls affixed to the vehicle body, the side walls being formed to extend laterally outward from each other to a deployed position, the side walls extending beyond the wheel base when in the deployed position for expanded interior space, the side walls being formed to fold laterally inward toward each other to a stowed position, the side walls contracting within the wheel base when in the stowed position; and multiple patient supports affixed to the side walls, formed to be horizontally aligned when the side walls are extended in the deployed position.

2. The trauma care system of claim 1 wherein each of the side walls comprising upper and lower portions, the upper portions formed to fold laterally outward from each other beyond the wheel base when the side walls are in the deployed position, the upper portions formed to fold laterally inward toward each other within the wheel base when the side walls are in the stowed position.

3. The trauma care system of claim 2 wherein the upper portions formed to fold laterally inward toward each other to reduce the vertical height of the side walls when the side walls are in the stowed position.

4. The trauma care system of claim 3 wherein the patient supports comprising uppermost and lowermost patient supports, the uppermost patient supports affixed to the upper portions of the side walls, the lowermost patient supports affixed to the lower portions of the side walls.

5. The trauma care system of claim 4 wherein the uppermost patient supports formed to fold toward the upper portion of the side walls when in the stowed position.

6. The trauma care system of claim 5 wherein the uppermost patient supports comprise a fixed portion affixed to the upper portion of the side walls and a foldable portion hingedly secured to the fixed portion.

7. The trauma care system of claim 4, further comprising a vertically adjustable treatment table the treatment table having treatment positions adjacent to the uppermost and lowermost patient supports to facilitate transfer of a patient between the treatment table and a desired one of the uppermost and lowermost patient supports.

8. The trauma care system of claim 7 wherein the treatment table having a stowed position wherein the vertical height of the treatment table is less than the vertical height of the side walls when the side walls are in the stowed portion.

9. The trauma care system of claim 7 comprising a plurality of rails formed to extend from the treatment table toward the uppermost and lowermost patient supports to assist in the transfer of patients between uppermost and lowermost patient supports and the treatment table.

10. The trauma care system of claim 7 comprising a treatment surface disposed in a horizontal plane, the treatment table further comprising an equipment and supplies module, formed to store medicine and treatment equipment, disposed within the treatment table, positioned at a fixed distance below the treatment surface to facilitate access to medicine and supplies stored therein during treatment procedures.

11. The trauma care system of claim 10 wherein the equipment and supplies module contains tanks of medical gases and water.

12. The trauma care system of claim 1 further comprising a roof removably attachable to the side walls.

13. The trauma care system of claim 1 further comprising work counters affixed to the side walls.

14. The trauma care system of claim 13 wherein the work counters comprising sinks disposed therein.

15. The trauma care system of claim 1 wherein the system comprises a trailer.

16. The trauma care system of claim 1 further comprising flak blankets attachable to the side walls.

17. The trauma care system of claim 1 further comprising an auxiliary power unit disposed within the vehicle body.

* * * * *